United States Patent [19]

Brunson et al.

[11] Patent Number: 6,018,762
[45] Date of Patent: Jan. 25, 2000

[54] RULES-BASED SYNCHRONIZATION OF MAILBOXES IN A DATA NETWORK

[75] Inventors: Gordon R. Brunson, Broomfield; William Katamura, Niwot, both of Colo.

[73] Assignee: Lucent Technologies Inc., Murray Hill, N.J.

[21] Appl. No.: 09/052,169

[22] Filed: Mar. 31, 1998

[51] Int. Cl.$^7$ .................................................. G06F 15/16
[52] U.S. Cl. ........................................ 709/206; 709/248
[58] Field of Search .................................. 709/248, 206, 709/207, 100, 106, 213, 214, 93.24; 379/93.01; 714/20; 707/10, 104, 201, 203

[56] References Cited

U.S. PATENT DOCUMENTS

| 5,647,002 | 7/1997 | Brunson | 380/49 |
| 5,732,247 | 3/1998 | Dearth et al. | 395/500 |
| 5,758,354 | 5/1998 | Huang et al. | 707/201 |
| 5,948,059 | 9/1999 | Woo et al. | 709/206 |
| 5,951,638 | 9/1999 | Hoss et al. | 709/206 |

FOREIGN PATENT DOCUMENTS

9724678  7/1997  WIPO ............................ G06F 13/42

OTHER PUBLICATIONS

Rand Morimoto, "Remote and Mobile Computing IRAS, PPTP, and the Remote Node Traveler," http://ntweb.cco-.com/f–hem1.htm, 4 pages, No Date.

*Primary Examiner*—Mehut Geckil
*Attorney, Agent, or Firm*—David Volejnicek

[57] ABSTRACT

A way of synchronizing the contents of commonly-owned mailboxes (108, 111) in disparate messaging systems, such as an e-mail system (100) and a multimedia system (101), networked via the Internet (102). The e-mail system uses the existing auto-forwarding feature (115) of the Internet e-mail community to send a copy of every message arriving at the e-mail mailbox to the other system's synchronized mailbox. The other system applies a 3-part synchronization rule (113) to every message (200) arriving at its synchronized mailbox. If it detects a syncmark (204)—an identifier—of its own mailbox in the header (201) of the message, indicating that the message was previously copy-forwarded from this system, it just deletes the message. If it detects a syncmark or a pivot address of (any address resulting in message delivery to) the e-mail mailbox in any header field of the message other than the "From" field, indicating that the message is a new message copy-forwarded by the e-mail system, it stores the message in the synchronized mailbox but does not copy-forward it back to the e-mail mailbox. Any other message is a new message and is both stored in the synchronized mailbox and copy-forwarded, with the syncmark of the synchronized mailbox, to the e-mail mailbox. State changes of messages stored in each synchronized mailbox are detected and reported to the other synchronized mailbox, where like state changes are effected on corresponding messages.

19 Claims, 4 Drawing Sheets

RULES-BASED SYNCHRONIZATION OF MAILBOXES IN A DATA NETWORK

TECHNICAL FIELD

This invention relates to electronic messaging systems.

BACKGROUND OF THE INVENTION

Various types of electronic messaging systems are known in the art. They include single-medium systems such as e-mail systems and voice mail systems, as well as multimedia messaging systems, such as the Lucent Intuity® messaging system, that handle messages having any combination of voice, fax, text, data, and other media components.

It is not uncommon for a single user to have messaging accounts on a plurality of electronic messaging systems. This may be because all of the media in which the user wishes to send and/or receive messages are not compatible with a single messaging system, or because the user works in more than one location each served by a different messaging system, or because different messaging services are bundled with other services subscribed to by the user, such as Internet Service Provider accounts, school accounts, or accounts bundled with applications software or computer operating systems. But a user typically finds it inconvenient to have to access a plurality of messaging systems to get all of their messages. Such a user would typically find it advantageous to combine the contents of all mailboxes so that the user could get all of their messages through one mailbox, and to be able to do so even if the providers of the disparate messaging services are neither motivated enough nor coordinated enough to provide such a service.

A well-known technique for combining the contents of multiple mailboxes into a single view is client aggregation. This method is believed to be employed by many vendors including Qualcomm (in their Eudora e-mail client application) and Microsoft (in their Exchange and Outlook products, and in general by the Windows Messaging Architecture). This method is most beneficial when only the aggregation point is always used to view and access messages. This is because, when the messages are aggregated, they are generally removed from the source services, thereby eliminating the need to keep track of messages in more than one place. Client aggregation may aggregate to the client, as in the case of Eudora, or one may have an option to aggregate through the client back to a central server, as in the case of Exchange. In this latter case, the client must be active for the aggregation to occur, and this is generally not a reliable assumption, especially when trying to achieve telephony levels of quality-of-service. Some aggregation methods include an option to "Leave Messages On Server", but this creates the need for a state database to determine which messages have already been retrieved and which ones are new the next time a client accesses the source service, thus leading to performance problems as noted above.

Synchronization is a process by which two or more different sets of data from one or more different applications are made semantically equivalent, i.e., they come to contain the same information even though they may represent that information differently. The ability to provide synchronization between mailboxes by using a messaging system's application program interface (API) has been demonstrated in U.S. Pat. No. 5,647,002. The arrangement disclosed in that patent is believed to be the most feature-complete method of mailbox-content synchronization between e-mail and voicemail to-date. However, it, too suffers from some drawbacks. First, because the arrangement relies on a separate piece of software periodically accessing each mailbox as though it were a client, it imposes some performance limitations on each system. Second, because each messaging vendor seeks to provide a "richer" user experience at the client interface than its competitors, the use of a "standard" client-side API is often not sufficient to provide full interoperability between disparate messaging systems. Third, synchronization is there achieved by continually comparing the current state with a previous state to identify state changes; this creates the need for an intermediate-states database, which may be costly to maintain. And finally, to avoid unnecessary administration of passwords in the synchronizer software, there may be development associated with adapting the e-mail server to support synchronizer access to the mailbox, and this requires participation from sometimes-unwilling competing messaging-system vendors.

SUMMARY OF THE INVENTION

This invention is directed to solving the problems and meeting the needs of the prior art. According to the invention, there is provided a method of and an apparatus for synchronizing at least the in-box portions, and preferably the entire contents, of two or more mailboxes located in two or more messaging systems. Illustratively, the mailboxes are either owned by the same user or used for a same purpose. Also illustratively, the different messaging systems provide different, complementary, features or capabilities—for example, a first system is a multimedia messaging system and a second system is an e-mail system. The messaging systems are networked together. In response to receipt of each message for a mailbox of the second messaging system (a second mailbox) whose contents are being synchronized with the contents of a mailbox of the first messaging system (first mailbox), the second messaging system stores the received message in the second mailbox, and also makes and sends a copy of the received message to the first messaging system for the first mailbox. Thus, any message that arrives at the second mailbox is also sent to the first mailbox. If the second messaging system is an e-mail system and if the messaging systems are networked together via the Internet, this functionality can be implemented using an auto-forwarding feature of the Internet e-mail community, which already exists in many e-mail systems. Hence, the e-mail system can be used "as is", without modification. Consequently, there is no need for e-mail system vendors and other messaging system vendors who want to synchronize with e-mail mailboxes to coordinate the development, release, or deployment of cooperating products. In response to receipt of each message for the first mailbox, the first messaging system determines a source of the received message: is it a message looped back to itself (a message forwarded by the first messaging system to the second messaging system and copy-forwarded back by the second messaging system), is it a new message copy-forwarded by the second messaging system (copy-forwarded message), or is it a message from another source (new message). Illustratively, the first messaging system looks for a looped-back message by inspecting the header of the received message to determine if it includes a syncmark—an identifier—of the first mailbox, which would have been inserted into the header if the message had previously been copy-forwarded from itself to the second messaging system. If the message is a looped-back message, both the first and the second system have already received it before. So, in response to determining that the message was received from the second messaging system and the second messaging system received the message from the first messaging system, the first messaging system simply discards the received message, without more. Illustratively, the first messaging system looks for a copy-forwarded message by inspecting the message header to determine if it includes either the syncmark of the second mailbox or a pivot address of the second mailbox in any header field but the message-source field. A pivot address of the second mailbox is any address that results in delivery of the message to the second mailbox. If the message is a copy-forwarded message, it has already been received by the second messaging system but not by the first messaging system. So, in response to determining that the message was received from the second messaging system and that the second messaging system received the message from a source other than the first messaging system, the first messaging system stores the received message in the first mailbox. But it does not make and send a copy thereof back to the second mailbox. Illustratively, the first messaging system considers any messages other than looped-back messages and copy-forwarded messages to be new messages. New messages have not yet been received by either messaging system. So, in response to determining that the message was received from a source other than the second messaging system, the first messaging system stores the received message in the first mailbox, and also makes and sends a copy of the received message to the second messaging system for the second mailbox. Illustratively, the first messaging system includes the syncmark of the first mailbox in the message copy.

Preferably, not only the in-box but rather the entire contents of associated mailboxes are synchronized. Accordingly, a change in state of any message in any of the associated mailboxes is detected and reported to the other associated mailboxes, whereupon the like state change to a corresponding message is effected in each of those mailboxes.

These and other advantages and features of the invention will become more apparent from the following description of an illustrative embodiment of the invention considered together with the drawing.

DETAILED DESCRIPTION

Figure 1:
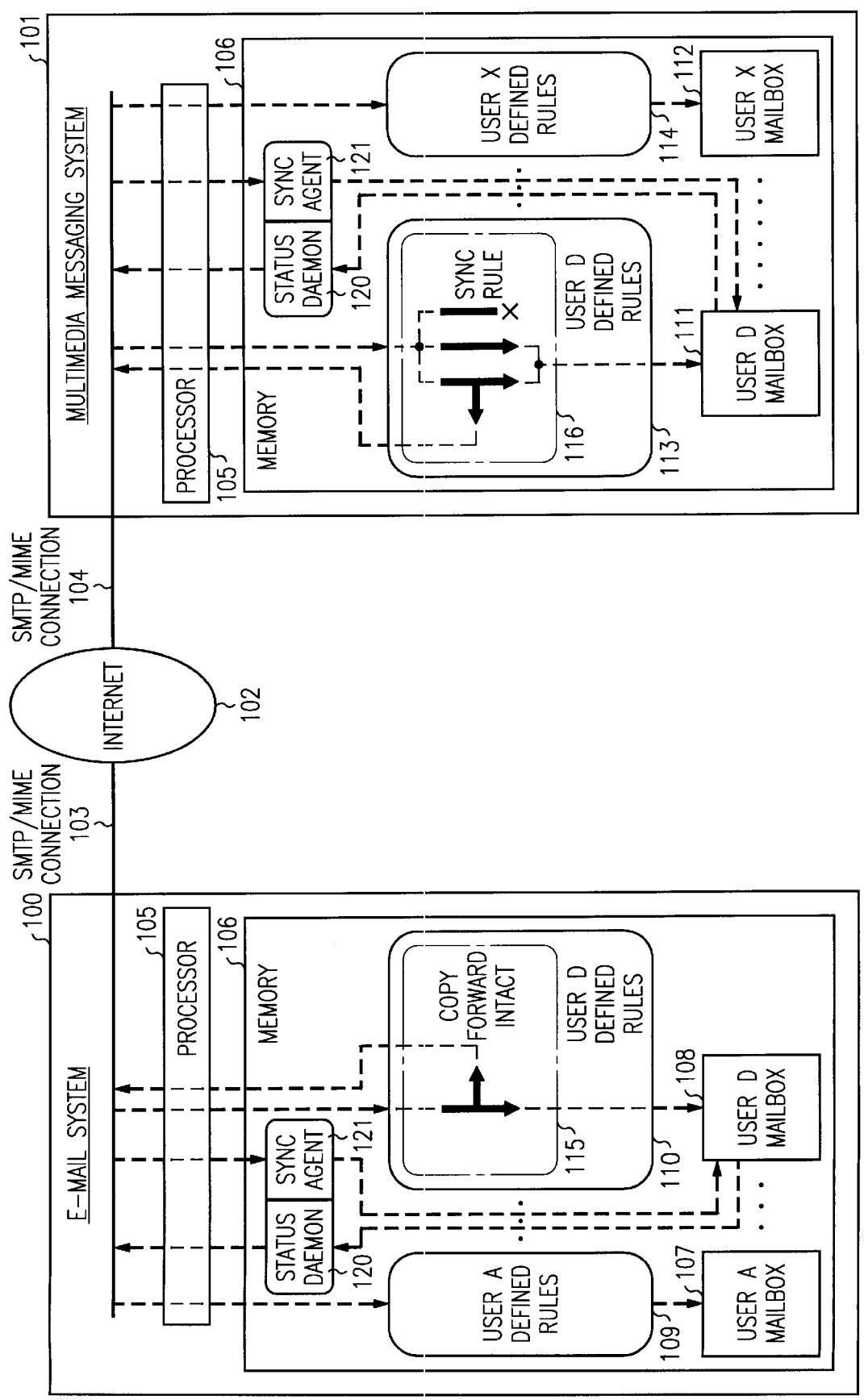
FIG. 1 is a block diagram of a communications network that includes an illustrative embodiment of the invention.

FIG. 1 shows a communications network that comprises a plurality of messaging systems 100–101 interconnected by a communications medium 102. The network can include any number of messaging systems, and the messaging systems can be any similar or dissimilar systems. In this illustrative example, two messaging systems are shown: a conventional e-mail system 100, and a multimedia messaging system 101 such as the Lucent Intuity messaging system. Likewise, the communications medium can be any one or a combination of media such as a local area network (LAN), a telecommunications network, or an intranet. In this illustrative example, the communications medium is shown to be the Internet 102. Each system 100–101 has its own connection 103–104, respectively, to Internet 102. In this illustrative example, connections 103–104 are conventional simple mail transfer protocol (SMTP)/multipurpose Internet mail extensions (MIME) protocol connections.

Figure 3:
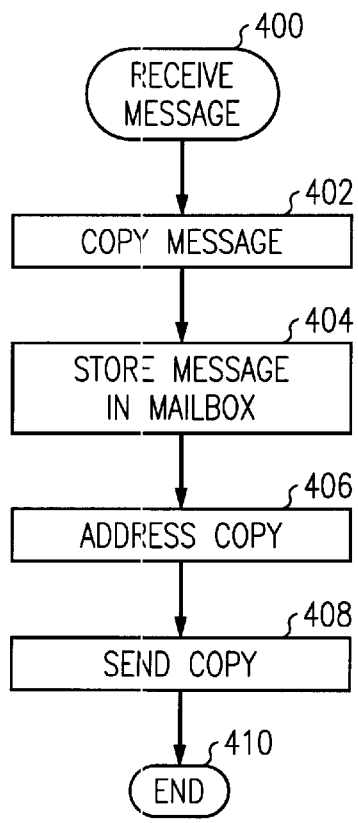
FIG. 3 is a flow diagram of a function effected by a copy-forward intact rule of an e-mail system of the network of FIG. 1.

Each system 100–101 is a stored-program-controlled system that comprises a control processor 105 and a memory 106 that stores data and control programs for execution by processor 105. E-mail system 100 defines in its memory 106 a plurality of user mailboxes 107–108, one for each e-mail system subscriber, or user, A–D, respectively. Associated with each mailbox 107–108 is a set of user-defined rules 109–110, respectively, which are also stored in memory 106. Rules 109–110 of one or more users A–D include a "transport copy-forward" rule, also referred to as a "copy-forward intact" rule, 115. Rule 115 is a standard rule in e-mail systems. Its execution causes a copy to be made of every message delivered to the corresponding mailbox 108 and causes the copy to be sent, with the header and the contents of the original message intact, to whatever address has been programmed into the rule. The operations of rule 115 are shown in FIG. 3. Whenever system 100 receives a message for mailbox 108 of user D, rule 115 is executed by processor 105 of system 100, at step 400. Processor 105 of system 100 makes an exact copy of the received message, at step 402, and stores the received message in mailbox 108, at step 404. Processor 105 of system 100 then addresses the message copy with a forwarding destination address specified by rule 115, at step 406, and sends the addressed copy to the destination, at step 408. Execution of rule 115 then ends, at step 410.

Like system 100, multimedia messaging system 101 defines in its memory 106 a plurality of user mailboxes 111–112, one for each multimedia messaging system subscriber, or user, D–X, respectively. Also associated with each mailbox 111–112 is a set of user-defined rules 113–114, respectively, which are also stored in memory 106. As described so far, the network of FIG. 1 is conventional.

According to the invention, rules 113–114 of one or more users D–X of system 101 include a sync rule 116. Sync rule 116 effects synchronization of incoming-message contents of its corresponding mailbox 111 on system 101 and an associated one or more mailboxes on system 100 and/or other messaging systems of the network of FIG. 1, in cooperation with rules 115 or 116 of those associated mailboxes. In this illustrative example, it is assumed that mailbox 108 in system 100 and mailbox 111 of system 101 both belong to the same user D, and so sync rule 116 of mailbox 111 effects synchronization of mailbox 111 with mailbox 108 in cooperation with rule 115 of mailbox 108.

Figure 2:
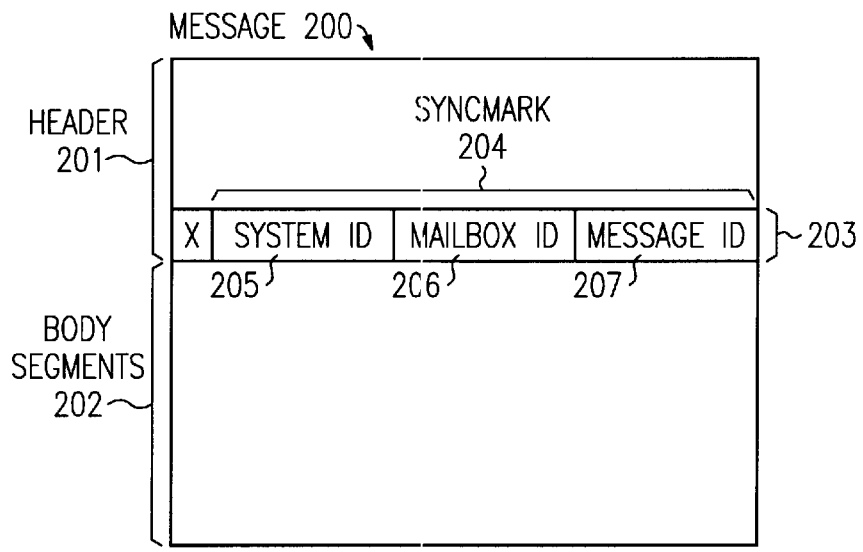
FIG. 2 is a block diagram of a message of the network of FIG. 1.
Figure 4:
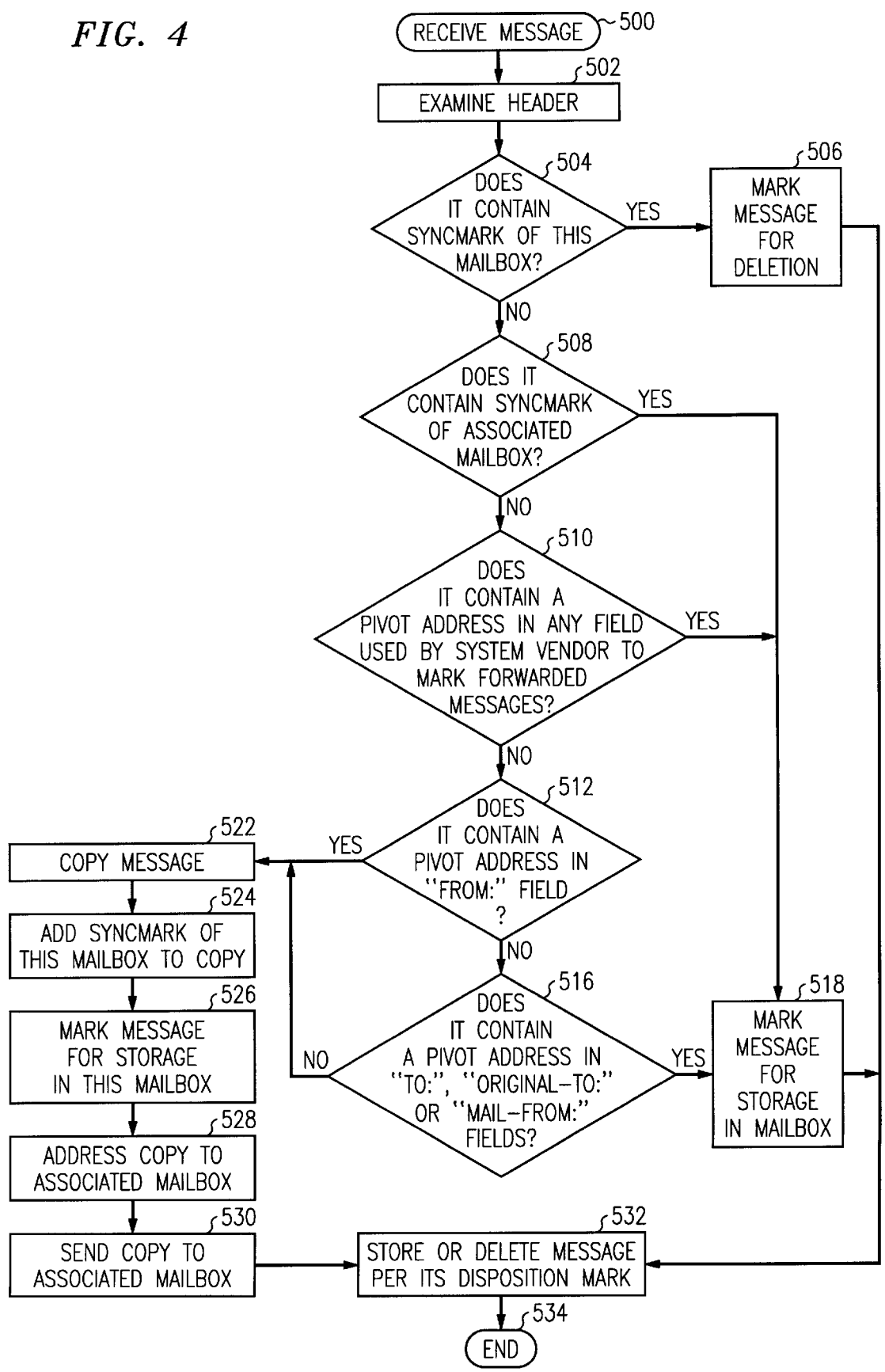
FIG. 4 is a flow diagram of a function effected by a sync rule of a multimedia messaging system of the network of FIG. 1.

The operations of sync rule 116 are shown in FIG. 4. Whenever system 101 receives a message for mailbox 111 of user D, rule 116 is executed by processor 105 of system 101, at step 500. An illustrative message 200, comprising a header 201 and one or more body segments 202, is shown in FIG. 2. A message received for mailbox 111 can be of three types: new message, new message forwarded by system 100, and looped-back message (forwarded by system 101 to system 100 and back). So processor 105 of system 101 examines header 201 of received message 200 to determine its type, at step 502. Processor 105 of system 101 checks whether message header 201 contains a syncmark 204 of mailbox 111, which would have been inserted into the header by rule 116 had message 200 been previously forwarded from mailbox 111, at step 504. If received message 200 contains the syncmark 204 of mailbox 111, message 200 is a looped-back message, and hence processor 105 marks it for deletion, at step 506, without delivering it to mailbox 111 or taking other action with respect thereto. At step 532, the message is finally either deleted or stored in mailbox 111 according to its disposition mark. Execution of rule 116 then ends, at step 534.

Returning to step 504, if it is found that received message 200 does not contain the syncmark 204 of mailbox 111, message header 201 is examined further to determine if message 200 is a copy-forward message forwarded from associated mailbox 108, at steps 508–516. This determination is made on the basis of whether header 201 contains a "pivot" address of mailbox 108 in one or more particular header fields. The pivot address of mailbox 108 is its SMTP protocol address or any address directly related to this SMTP address such that it will result in message delivery to mailbox 108, e.g., an alias. Pivot addresses are known to rule 116 because they have been programmed into the rule as the destination addresses for messages being copy-forwarded by rule 116. Any of a number of determinations may be used to detect the presence of a pivot address in the header, and only one determination is necessary to satisfy this condition.

For example, if a syncmark 204 of an associated mailbox 108 is found in header 201, at step 508, message 200 is considered to be a copy-forward message from mailbox 108. Otherwise, if a pivot address is found in any field of header 201 that is known to be used by the vendor of system 100 to mark forwarded messages, at step 510, message 200 is considered to be a copy-forward message from mailbox 108. Otherwise, if a pivot address is found in the "From:" field of header 201, at step 512, then message 200 is considered a new message and not a copy-forward message. Otherwise, if a pivot address is found in the "To:", "Original-To:", or "Mail-From:" fields of header 201, at step 516, then message 200 is considered to be a copy-forward message.

If message 200 is determined to be a copy-forward message from an associated mailbox 108, it is marked for storage in the receiving mailbox 111 only, at step 518, and is not copy-forwarded back to the pivot address. But if message 200 is not a copy-forward message, then message 200 is deemed to be a new message, and it is delivered both locally and remotely, at steps 522–530. Processor 105 of system 101 makes a copy of the message, at step 522, and adds a syncmark 204 of mailbox 111 to the copy, at step 524. In the SMTP environment, syncmark 204 is a new line 203 added to header 201 of the message copy, as shown in FIG. 2. Illustratively, new line 203 begins with an "x" character to designate it as a header extension, followed by a syncmark 204 comprising an identifier 205 of system 101, an identifier 206 of mailbox 111, and a message identifier 207. Syncmark 204 will be used by rule 116 at step 504 to identify this message as a looped-back message when it is returned by system 100. Processor 105 of system 101 then marks the received message for storage in mailbox 111, at step 526, addresses the message copy to mailbox 108, at step 528, and sends the addressed copy to mailbox 108, at step 530. Following step 518 or step 530, the message is finally either deleted or stored in mailbox 111 according to its disposition mark, at step 532. Execution of rule 116 then ends, at step 534.

A further synchronization option includes the ability to synchronize message-read and message-deleted status of message copies after they have been delivered to a plurality of associated mailboxes. This requires event-monitoring and reporting capabilities in each of the message systems to pro-actively send status updates to synchronization agents running on the associated systems. Accordingly, each synchronized mailbox 108 and 111 in each system 100 and 101 has associated therewith a status daemon 120 and a sync agent 121. Both status daemon 120 and sync agent 121 are control programs stored in memory 106 and executed by processor 105.

Figure 5:
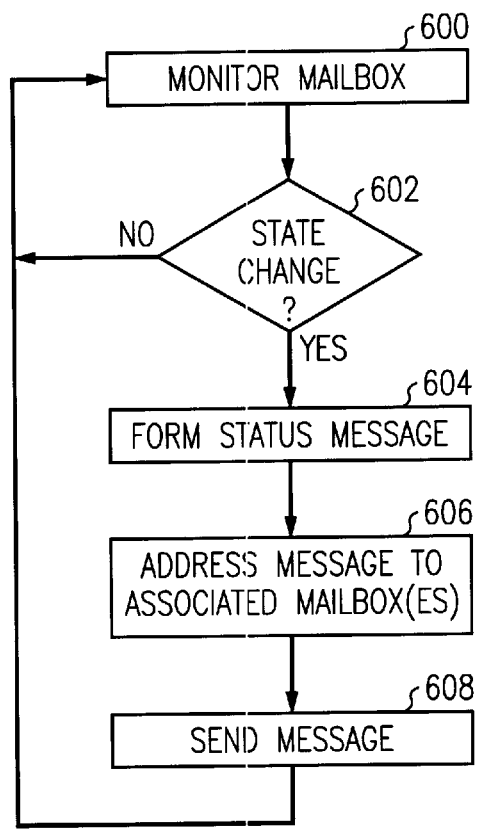
FIG. 5 is a functional flow diagram of a status daemon of the messaging systems of FIG. 1.

A daemon is an agent program which continuously operates in the background on a server and provides resources to client systems on a network—in this case, to the remote server which acts as a client. The operation of a status daemon 120 is shown in FIG. 5. It monitors activity in its corresponding mailbox, at step 600. If a message in that mailbox changes states (e.g., it is marked as having been read or deleted), status daemon 120 detects the change in status, at step 602, and reports it to the associated mailboxes by forming a status message, at step 604, addressing it to the associated mailboxes, at step 606, and sending the status message, at step 608.

Figure 6:
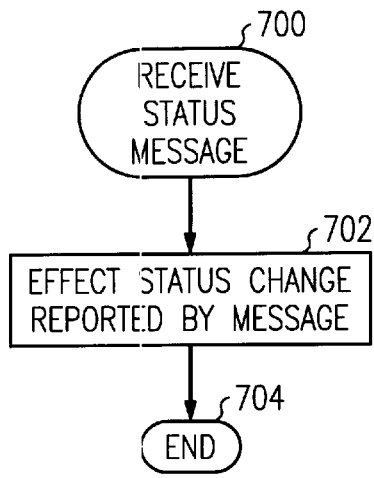
FIG. 6 is a functional flow diagram of a sync agent of the messaging systems of FIG. 1.

The operation of a sync agent 121 is shown in FIG. 6. When a status message is received for the corresponding mailbox, at step 700, sync agent 121 is executed and effects the status change indicated by the received message in its corresponding mailbox, at step 702. Execution of sync agent 121 then ends, at step 704.

As with any feature that requires participation from a remote entity, there is some overhead in setting up and maintaining the operation of the feature. When a rule is created, all of the parameters are specified, and after it is created, it exists in one of three states: initializing, active, or suspended. When the rule is first activated, it preferably goes through an initialization step where a test message is sent to the remote system, and a copy is expected back within a reasonable amount of time. If the copy is received and the syncmark is detected successfully, then the rule can go into the active state. If the copy is not detected with a valid syncmark in a specified period of time, the rule goes into a suspended state and a notification message is generated indicating that the rule is suspended. If at any time in the active state the mailbox begins to be unable to forward messages to the indicated address, the rule also goes into the suspended state with an indication sent to the mailbox. To restart the rule from the suspended state, it must go through the initialization state again. It should be obvious that not all transmissions are guaranteed by the protocol of the rule because there is no acknowledgment of successfully-forwarded messages. Also, detection of error messages is not 100% guaranteed among systems on the Internet.

Of course, various changes and modifications to the illustrative embodiment described above will be apparent to those skilled in the art. For example, synchronization can be effected among more than two mailboxes, as mentioned above, and between mailboxes in the same messaging system. Also, synchronization can be effected only for some types and not for other types of messages, or only for certain portions of messages. Or, complex conditions can be imposed on synchronization, e.g., synchronize only messages containing certain subjects, or only messages from certain originators, etc. Such changes and modifications can be made without departing from the spirit and the scope of the inventions and without diminishing its attendant advantages. It is therefore intended that such changes and modifications be covered by the following claims.

What is claimed is:

1. A method of synchronizing contents of a first mailbox of a first messaging system with contents of a second mailbox of a second messaging system communicatively connected to the first messaging system, comprising the steps of:

in response to receipt of each message for the second mailbox, the second messaging system storing the received message in the second mailbox and also making and sending a copy of the received message to the first messaging system for the first mailbox;

in response to receipt of each message for the first mailbox, the first messaging system determining a source of the received message;

in response to determining that the message was received from a source other than the second messaging system, storing the received message in the first mailbox and making and sending a copy of the received message to the second messaging system for the second mailbox;

in response to determining that the message was received from the second messaging system and the second messaging system received the message from a source other than the first messaging system, storing the received message in the first mailbox without making and sending a copy thereof to the second mailbox; and in response to determining that the message was received from the second messaging system and the second messaging system received the message from the first messaging system, discarding the received message without storing it in the first mailbox and without making and sending a copy thereof to the second mailbox.

2. The method of claim 1 wherein:

the step of making and sending a copy of the received message includes the step of
including an identifier of the first mailbox in the copy of the received message; and the step of discarding the received message includes the step of
in response to determining that the received message includes the identifier of the first mailbox, discarding the received message.

3. The method of claim 2 wherein:

the identifier of the first mailbox comprises a syncmark of the first mailbox.

4. The method of claim 3 wherein:

the syncmark comprises a messaging system identifier, a mailbox identifier, and a message identifier.

5. The method of claim 2 wherein:

the step of storing the received message in the first mailbox comprises the step of
in response to determining that the received message includes an identifier of the second mailbox in a header field of the received message other than a message-source field, and does not include the identifier of the first mailbox, storing the received message in the first mailbox.

6. The method of claim 3 wherein:

the step of storing the received message in the first mailbox comprises the steps of:
in response to determining that the received message includes either a syncmark of the second mailbox or a pivot address of the second mailbox in a header field of the received message other than a message-source field, and does not include the syncmark of the first mailbox, storing the received message in the first mailbox.

7. The method of claim 6 wherein:

the pivot address comprises any address that results in delivery of the message to the second mailbox.

8. The method of claim 1 further comprising the steps of:

in response to a change in state of a message stored in the second mailbox, the second messaging system sending a first notification to the first messaging system for the first mailbox;

in response to receiving the first notification, the first messaging system effecting a like change in state of a corresponding message stored in the first mailbox;

in response to a change in state of a message stored in the first mailbox, the first messaging system sending a second notification to the second messaging system for the second mailbox; and in response to receiving the second notification, the second messaging system effecting a like change in state of a corresponding message stored in the second mailbox.

9. An apparatus that performs the method of claim 1 or 2 or 3 or 4 or 5 or 6 or 7 or 8.

10. A first messaging system for networking with a second messaging system that responds to receipt of each message for a second mailbox of the second messaging system by storing the received message in the second mailbox and also making and sending a copy of the received message to the first messaging system for a first mailbox, the first messaging system comprising:

a memory defining the first mailbox, whose contents are synchronized with contents of the second mailbox; and a processor responsive to receipt of each message for the first mailbox by determining a source of the received message, storing the received message in the second mailbox and making and sending a copy of the received message to the second messaging system for the second mailbox if the source is determined to be other than the second messaging system, storing the received message in the first mailbox without making and sending a copy of the received message to the second messaging system for the second mailbox if the source is determined to be the second messaging system and the second messaging system received the message from a source other than the first messaging system, and discarding the received message without storing the received message in the first mailbox or making and sending a copy of the received message to the second messaging system for the second mailbox if the source is determined to be the second messaging system and the second messaging system received the message from the first messaging system.

11. The first messaging system of claim 10 wherein:

the processor operates under control of a user-defined synchronization rule implemented as a computer program that is executed by the processor.

12. The first messaging system of claim 10 for networking with an electronic mail system, wherein:

the first messaging system is a multimedia messaging system.

13. The first messaging system of claim 10 wherein:

the processor includes an identifier of the first mailbox in the copy of each received message that it makes and sends to the second messaging system for the second mailbox, and the processor discards the received message if it determines that the received message includes the identifier of the first mailbox.

14. The first messaging system of claim 13 wherein:

the identifier of the first mailbox comprises a syncmark of the first mailbox.

15. The first messaging system of claim 14 wherein:

the syncmark comprises a messaging system identifier, a mailbox identifier, and a message identifier.

16. The first messaging system of claim 13 wherein:

the processor stores the received message in the first mailbox if it determines that the received message includes an identifier of the second mailbox in a header field of the received message other than a message-source field and does not include the identifier of the first mailbox.

17. The first messaging system of claim 14 wherein:

the processor stores the received message in the first mailbox if it determines that the received message includes either a syncmark of the second mailbox or a pivot address of the second mailbox in a header field of the received message other than a message-source field and does not include the syncmark of the first mailbox.

18. The first messaging system of claim 17 wherein:

the pivot address comprises any address that results in delivery of the message to the second mailbox.

19. The first messaging system of claim 10 wherein:

the processor responds to a change in state of a message stored in the first mailbox by sending a notification thereof to the second messaging system for the first mailbox so that the second messaging system can effect a like change in state of a corresponding message stored in the second mailbox, and the processor further responds to receipt of a notification from the second messaging system of a change in state of a message stored in the second mailbox by effecting a like change in state of a corresponding message stored in the first mailbox.

\* \* \* \* \*